US012694227B1

(12) United States Patent
Barkan

(10) Patent No.: US 12,694,227 B1
(45) Date of Patent: Jul. 28, 2026

(54) SYSTEM OF CORRECTING LLM HALLUCINATIONS

(71) Applicant: Zeev Barkan, Jerusalem (IL)

(72) Inventor: Zeev Barkan, Jerusalem (IL)

( * ) Notice: Subject to any disclaimer, the term of this patent is extended or adjusted under 35 U.S.C. 154(b) by 0 days.

(21) Appl. No.: 19/291,376

(22) Filed: Aug. 5, 2025

(51) Int. Cl.
*G06F 40/35* (2020.01)
*G06F 40/279* (2020.01)
*G06F 40/289* (2020.01)
*G10L 15/22* (2006.01)

(52) U.S. Cl.
CPC ............ *G06F 40/35* (2020.01); *G06F 40/279* (2020.01); *G06F 40/289* (2020.01); *G10L 15/22* (2013.01)

(58) Field of Classification Search
CPC ........ G06F 40/30; G06F 40/40; G06F 40/289; G06F 40/35; G06F 40/205; G06F 40/226; G06F 40/279; G06F 40/284; G06F 40/56; G06F 16/3329; G06F 16/3344; G06F 16/3346; G06F 16/35; G06F 16/438; G06F 16/243; G06N 20/00; G10L 15/1822; G10L 15/22; G10L 15/26; G10L 15/16; G10L 15/18; G10L 2015/223
USPC .............................................................. 704/9
See application file for complete search history.

(56) References Cited

U.S. PATENT DOCUMENTS 11,861,320 B1 * 1/2024 Gajek ..................... G06F 40/40
12,340,238 B1 * 6/2025 Stănescu ................. G06F 9/451
12,340,557 B1 * 6/2025 Saraee .................. G06F 16/438
12,379,948 B1 * 8/2025 Vlasceanu .............. G06F 9/453
12,393,875 B2 * 8/2025 Strope .................. G06N 3/0464
12,412,138 B1 * 9/2025 Geene ................ G06Q 10/0633
2020/0104746 A1 * 4/2020 Strope ................. G06F 16/3344
2024/0062111 A1 * 2/2024 Strope ................. G10L 15/1822
2024/0187522 A1 * 6/2024 Yannam .............. H04M 3/5133
2024/0202221 A1 6/2024 Siebel et al.
2024/0289395 A1 * 8/2024 Zhou .................. G06F 16/9532
2024/0362418 A1 * 10/2024 Peng .................. G06F 16/3325
(Continued)

FOREIGN PATENT DOCUMENTS

CN 118535684 A 8/2024
CN 118940839 A 11/2024
(Continued)

OTHER PUBLICATIONS

Brahmaleen, "Hallucinations in Artificial Intelligence: Origins, Detection, and Mitigation", International Journal of Science and Research, vol. 14 Issue 1, Jan. 2025, pp. 1-15.
Liang, Mengfei, et al. "Thames: An end-to-end tool for hallucination mitigation and evaluation in large language models." arXiv preprint arXiv:2409.11353 (2024).pp. 1-24.
(Continued)

*Primary Examiner* — Vijay B Chawan
(74) *Attorney, Agent, or Firm* — FisherBroyles, LLP; Roger L. Browdy; James E. Mrose

(57) ABSTRACT

A system of correcting inaccuracies in chatbot responses, the system comprising a processing circuitry (PC) configured to: receive a chatbot's response to a user prompt, and receive data sources associated with the response; present, to the user, the chatbot response, and receive, from the user, one or more text segments, the one or more text segments being associated with a user-suspected hallucination or inaccuracy of the chatbot response; perform, on one or more of the data sources, at least one of: a text search, and a semantic search of one or more of the text segments; and present, to the user, data derivative of the text search and/or semantic search, thereby confirmation or correction of the chatbot response.

9 Claims, 7 Drawing Sheets

(56) References Cited

U.S. PATENT DOCUMENTS

| | | | | |
|---|---|---|---|---|
| 2024/0370709 | A1* | 11/2024 | Siebel | G06N 3/047 |
| 2024/0370769 | A1* | 11/2024 | Sheth | G06N 20/00 |
| 2024/0386253 | A1* | 11/2024 | White, Jr. | G06F 40/166 |
| 2024/0394176 | A1* | 11/2024 | Pean | G16H 70/20 |
| 2024/0419912 | A1* | 12/2024 | Somech | G06N 3/044 |
| 2025/0068667 | A1* | 2/2025 | Blum | G06F 16/345 |
| 2025/0078453 | A1* | 3/2025 | Saraee | G06V 10/40 |
| 2025/0078454 | A1* | 3/2025 | Saraee | G06V 10/761 |
| 2025/0193462 | A1* | 6/2025 | Govindarajan | G06Q 50/01 |
| 2025/0284721 | A1* | 9/2025 | Agrawal | G06F 16/3329 |
| 2025/0293998 | A1* | 9/2025 | Courcelle | G06N 3/0895 |

FOREIGN PATENT DOCUMENTS

| | | | |
|---|---|---|---|
| CN | 118964552 | A | 11/2024 |
| CN | 118966202 | A | 11/2024 |
| WO | 2024182285 | A2 | 9/2024 |

OTHER PUBLICATIONS

Huynh, "Automatic Hallucination detection with SelfCheckGPT NLI", Automatic Hallucination detection with SelfCheckGPT NLI, Nov. 2023, ,https://huggingface.co/blog/dhuynh95/automatic-hallucination-detection> online pp. 1-13.

Anonymous "AI Control Plane for LLM Reliability", Jan. 2025, website <https://www.qualifire.ai/>.

Doug Safreno Jan. 2024 , "How To Test For AI Hallucination", Gentrace pp. 1-8.

* cited by examiner

Chatbot Output Window 210

Prompt Input Window 205

1. Harrington v. Nexus Biotech
2. Orion Dynamics v. StratifyX Labs
3. Chen v. City of Brookhaven
4. Heliox Quantum Computing v. Cognitronix Solutions
5. Aetherbyte Technologies v. Syntrix Fusion Links: a b c d List US District court cases with the following characteristics ......

Chatbot Output Window 210

Prompt Input Window 205

1. Harrington v. Nexus Biotech
2. Orion Dynamics v. StratifyX Labs
3. Chen v. City of Brookhaven
Heliox Quantum Computing v. Cognitronix Solutions
5. Aetherbyte Technologies v. Syntrix Fusion Verify Links: a b c d List US District court cases with the following characteristics ......

Chatbot Output Verification Window 215

Chatbot Output Window 210

Prompt Input Window 205

1. Harrington
2. Orion Dyn
3. Chen v. Ci
   "Heliox Quantum Computing v. Cognitronix Solutions"

Not found in data sources

Heliox Qua
   Solutions
5. Aetherbyte chnologies v. Syntrix Fusion
Links: a b c d List US District court cases with the following characteristics .....

Receive a chatbot response to a user-supplied prompt, optionally accompanied by http links to data sources

305

Present the response to a user

310

Identify, based on the chatbot response and user input from the user, text or terms of suspected inaccuracy(s)

315

Based on suspected inaccurate text/terms, identify text/sections in the linked data sources

320

Modify (or append to) chatbot response, and presents modified response to the user

325

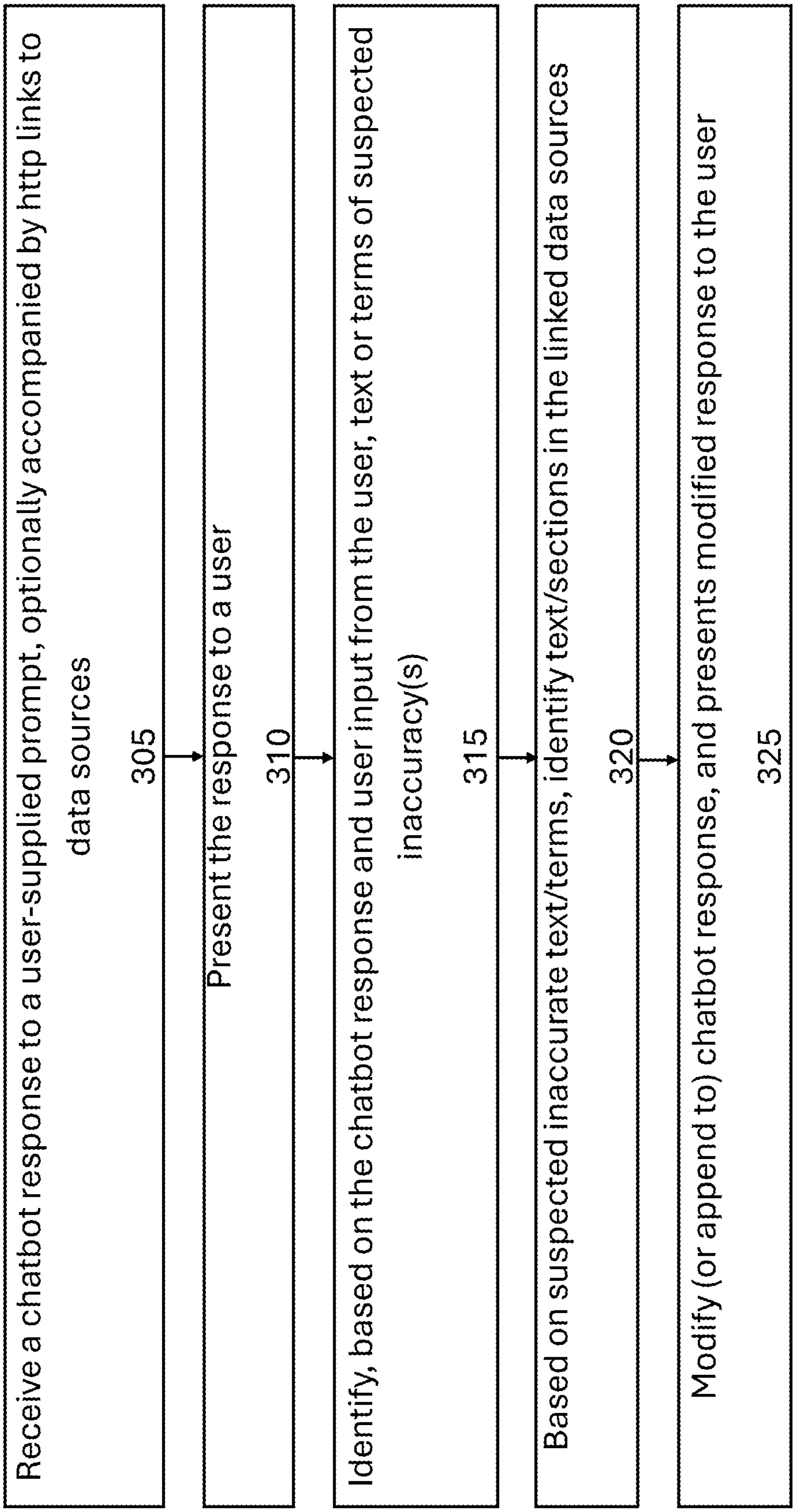

Fig. 3

SYSTEM OF CORRECTING LLM HALLUCINATIONS

TECHNICAL FIELD

The presently disclosed subject matter relates to use of chatbot systems such as large language models (LLMs), and in particular to implementation of systems for identification and correction of errors of such systems.

BACKGROUND

Problems of hallucinations, errors, and inaccuracies by chatbots have been recognized in the conventional art and various techniques have been developed to provide solutions.

SUMMARY

According to one aspect of the presently disclosed subject matter there is provided a system of c/orrecting inaccuracies in chatbot responses, the system comprising a processing circuitry configured to:

a) receive at least part of a chatbot's response to a user prompt and data indicative of data sources associated with the response;

b) present, to the user, data derivative of the chatbot response and receive, from the user, data indicative of one or more text segments, the one or more text segments being associated with a user-suspected hallucination or inaccuracy of the chatbot response;

c) perform, on one or more of the data sources, at least one of:

i. a text search, and ii. a semantic search of one or more of the text segments; and d) present, to the user, data derivative of the text search and/or semantic search, thereby providing confirmation or correction of the chatbot response.

In addition to the above features, the system according to this aspect of the presently disclosed subject matter can further comprise one or more of features (i) to (vi) listed below, in any desired combination or permutation which is technically possible:

(i) at least one of the data sources being provided by the chatbot;

(ii) the data indicative of the one or more text segments being derivative of a user interaction with a device user-interface while viewing the chatbot response;

(iii) the data derivative of the text search and/or semantic search being null, thereby indicating a hallucination in the chatbot response;

(iv) the data derivative of the text search and/or semantic search comprising a text segment of a data source, thereby providing a clarification, confirmation, or correction of the chatbot response;

(v) the chatbot being a large-language model (LLM);

(vi) the data derivative of the text search and/or semantic search being a corrected chatbot response.

According to another aspect of the presently disclosed subject matter there is provided a processing-circuitry-based method of correcting inaccuracies in chatbot responses, the method comprising:

a) receiving at least part of a chatbot's response to a user prompt and data indicative of data sources associated with the response;

b) presenting, to the user, data derivative of the chatbot response and receiving, from the user, data indicative of one or more text segments, the one or more text segments being associated with a user-suspected hallucination or inaccuracy of the chatbot response;

c) performing, on one or more of the data sources, at least one of a text search and a semantic search of one or more of the text segments; and d) presenting, to the user, data derivative of the text search and/or semantic search, thereby providing confirmation or correction of the chatbot response.

This aspect of the disclosed subject matter can further optionally comprise one or more of features (i) to (vi) listed above with respect to the system, mutatis mutandis, in any desired combination or permutation which is technically possible.

According to another aspect of the presently disclosed subject matter there is provided a computer-program product comprising a computer-readable non-transitory storage medium containing program instructions which, when read by processing circuitry, cause the processing circuitry to perform a method of correcting inaccuracies in chatbot responses, the method comprising:

a) receiving at least part of a chatbot's response to a user prompt and data indicative of data sources associated with the response;

b) presenting, to the user, data derivative of the chatbot response and receiving, from the user, data indicative of one or more text segments, the one or more text segments being associated with a user-suspected hallucination or inaccuracy of the chatbot response;

c) performing, on one or more of the data sources, at least one of a text search and a semantic search of one or more of the text segments; and d) presenting, to the user, data derivative of the text search and/or semantic search, thereby providing confirmation or correction of the chatbot response.

This aspect of the disclosed subject matter can further optionally comprise one or more of features (i) to (vi) listed above with respect to the system, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 3 illustrates a method of adding to and/or modifying chatbot responses to compensate for and/or correct hallucinations and/or inaccuracies, in accordance with some embodiments of the presently disclosed subject matter.

DETAILED DESCRIPTION

Figure 1:
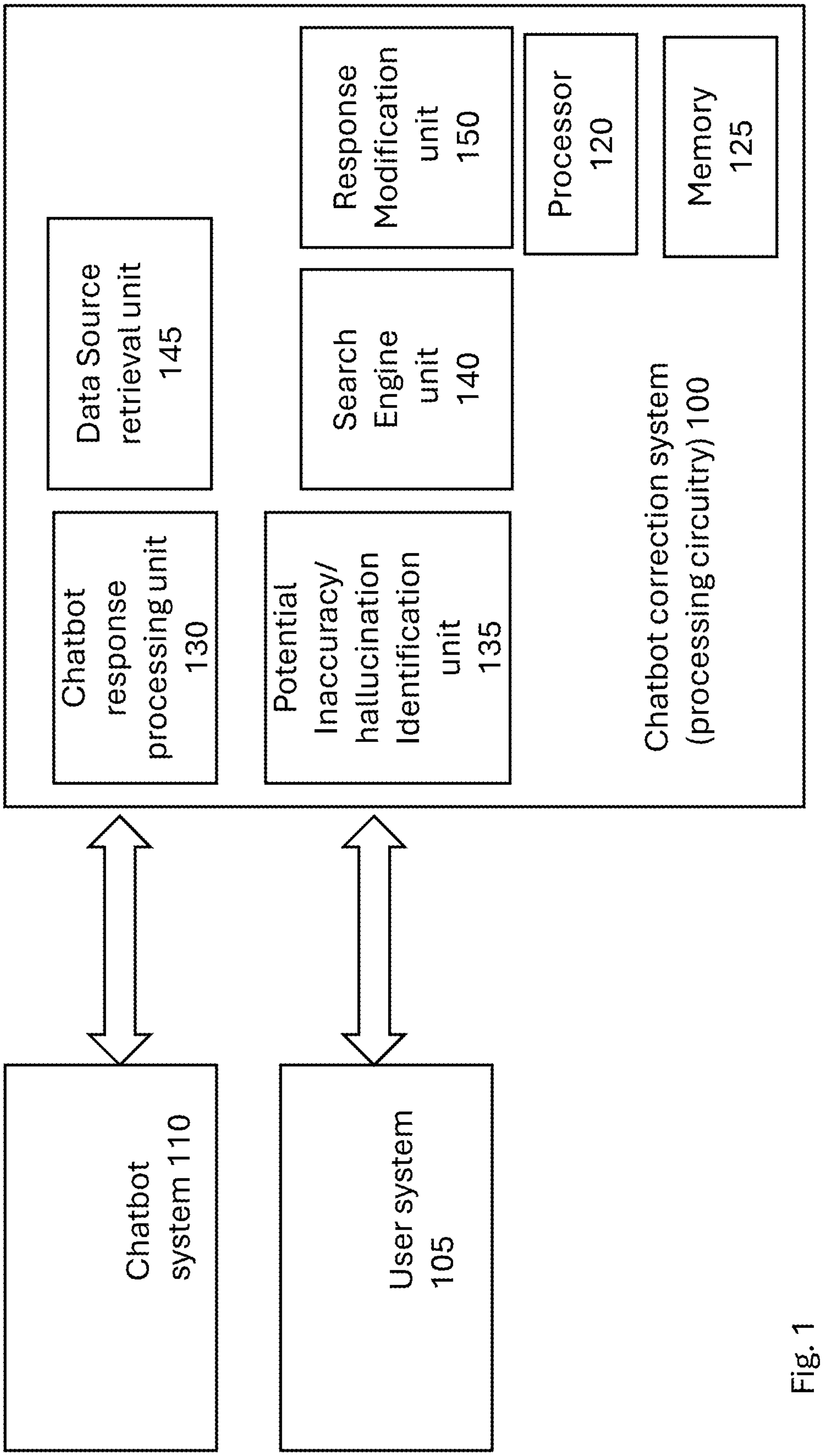
FIG. 1 illustrates a logical diagram of an example deployment of a chatbot correction system, in accordance with some embodiments of the present disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "encrypting", "decrypting", "determining", "calculating", "receiving", "providing", "obtaining", "emulating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Artificial intelligence-based chatbot systems (such as large language models), can suffer from hallucinations, and inaccuracies.

As used herein, a "hallucination" is interpreted to include text of a chatbot response that has no basis in data sources. Consequently: searching for the text (or performing a semantic search) in the data sources can return zero matching results. For example: where a prompt request for court cases with particular characteristics results in a chatbot response including a non-existent court case.

As used herein, an "inaccuracy" is interpreted to include text of a chatbot response which has a basis in the data sources, (as indicated by a textual or semantic search result) but for which the chatbot response is in reality incorrect. For example: where a prompt request for court cases with particular characteristics results in a chatbot response including a court case with different characteristics.

It is noted that the terms "hallucination" and "inaccuracy" may include other kinds of incorrect or unintended responses, and that some incorrect responses may fall into both categories or neither category.

Some embodiments of the presently disclosed subject matter are directed to a system which can—utilizing user input and data sources regarded as reliable—add to and/or modify chatbot responses to compensate for and/or correct hallucinations and/or inaccuracies.

FIG. 1 illustrates a logical diagram of an example deployment of a chatbot correction system, in accordance with some embodiments of the present disclosed subject matter.

Chatbot correction system (processing circuitry) 100 can be—for example—a system configured to receive prompts from a user, and then to provide the user with enhanced or corrected chatbot output.

Chatbot correction system (processing circuitry) 100 can be operably connected to user system 105, for example via the internet, to facilitate receipt of user prompts and to provide the user with the prompt responses.

User system 105 can be a computing system used by a user to interact with chatbot correction system (processing circuitry) 100. For example: user system 105 can be a personal computer, smartphone, tablet, other computing device etc. User system 105 can send a user's prompts to chatbot correction system (processing circuitry) 100. User system 105 can subsequently receive resulting chatbot responses. User system 105 can interface with a human user via a user interface such as a web browser or dedicated application.

Chatbot correction system (processing circuitry) 100 can be operably connected to chatbot system 110. Chatbot system 110 can be—for example—a publicly available chatbot accessed via the internet. Alternatively, chatbot system 110 can be e.g. a private chatbot accessed via a private network link.

Chatbot system 110 can be e.g. a chatbot model configured to provide natural language responses to user prompts. Chatbot system 110 can be, for example, a large-language model (LLM) or a different artificial intelligence system. Chatgpt™, Grok™, Claude™ etc. are examples of possibly suitable publicly available chatbots.

Chatbot system 110 can receive user prompts forwarded by chatbot correction system (processing circuitry) 100, and can generate corresponding responses, and can return the generated responses to chatbot correction system (processing circuitry) 100. The responses from chatbot system 110 can include, for example, one or more of:

a) textual, video, audio and/or other content that is responsive to the user prompt,
b) citations of external data sources that are deemed reliable and relevant to the user prompt
c) hyperlinks to external data sources that are deemed reliable and relevant to the user prompt Chatbot correction system (processing circuitry) 100 can include processor 120, and memory 125.

Processor 120 can be a suitable hardware-based electronic device with data processing capabilities, such as, for example, a general purpose processor (CPU), graphics processor (GPU), network processor (NP), digital signal processor (DSP), a specialized Application Specific Integrated Circuit (ASIC), one or more cores in a multicore processor, etc. Processor 120 can also consist, for example, of multiple processors, multiple ASICs, virtual processors, combinations thereof etc.

Memory 125 can be, for example, a suitable kind of volatile and/or non-volatile storage, and can include, for example, a single physical memory component or a plurality of physical memory components. Memory 125 can also include virtual memory. Memory 125 can be configured to, for example, store various data used in computation.

Chatbot correction system (processing circuitry) 100 can be configured to execute several functional modules in accordance with computer-readable instructions implemented on a non-transitory computer-readable storage medium. Such functional modules are referred to hereinafter as comprised in the processing circuitry. These modules can include, for example, chatbot response processing unit 130, data source retrieval unit 145, potential inaccuracy identification unit 135, search engine unit 140, and response modification unit 150.

Chatbot response processing unit 130 can manage the processing of chatbot responses. Chatbot response processing unit 130 can receive a chatbot response from chatbot system 110.

In some examples, chatbot response processing unit 130 can modify the chatbot response before presenting it to user system 105 (as described below). In some other examples, chatbot response processing unit 130 does not modify the chatbot response.

Chatbot response processing unit 130 can receive—from chatbot system 110 data descriptive of data sources that are deemed reliable and pertinent to the user prompt and/or prompt response. By way of non-limiting example: such data sources can be journals, books, websites etc. (e.g. existing online, offline, in private repositories etc.). Chatbot system 110 can provide these references e.g. as hyperlinks, bibliographic data etc.

Chatbot response processing unit 130 can present a chatbot response to the user via user system 105.

Data source retrieval unit 145 can retrieve data sources that are pertinent to a chatbot response. For example, data source retrieval unit 145 can access one or more hypertext transfer protocol (HTTP) links to data source(s) provided by chatbot system 110 as part of its chatbot response. By way of further example: data source retrieval unit 145 can access a named document in a private data repository. By accessing such data sources, data source retrieval unit 145 can maintain additional information or content that is relevant to the chatbot response, thereby enabling subsequent verification or augmentation by response modification unit 145.

After chatbot correction system (processing circuitry) 100 has presented a chat response to the user via user system 105, the user can, using e.g. a user interface of a web browser or custom application, identify text that the user perceives to be an error or hallucination.

Potential inaccuracy identification unit 135 can receive user input prepared, for example, through a browser interface or application on user system 105. Potential inaccuracy/hallucination identification unit 135 can utilize this input in conjunction with search engine unit 140 and response modification unit 145 to identify potential inaccuracies/hallucinations in the chatbot response. For example, potential inaccuracy identification unit 135 can receive user input specifying specific text, and/or key terms, and can supply these to search engine unit 140 so as to validate or correct the chatbot output.

Search engine unit 140 can utilize e.g. terms and/or texts provided by potential inaccuracy identification unit 135 based on user input. Search engine unit 140 can perform e.g. text string searches or semantic searches of user input within documents that were indicated as data sources (and which were—for example—retrieved by data source retrieval unit 145 or otherwise made available). Search engine unit 140 can identify e.g. portions of documents or full documents that are pertinent to the terms and/or text and can provide these to response modification unit 145. In this manner, chatbot correction system (processing circuitry) 100 is enabled to use supporting information to validate chatbot outputs, and/or identify discrepancies between the chatbot response and data sources.

Response modification unit 145 can utilize results obtained by search engine unit 140 and can update or modify the chatbot response based on the results of searching for the user inputs in the data sources. For example, response modification unit 145 can display identified texts to the user alongside the chatbot response to provide references that can e.g. confirm the response (if the reference confirms the response) or flag the response as not reliable (if the reference contradicts the response). Furthermore, response modification unit 145 can also display an indication that no relevant texts were found in the data sources (i.e. when the search yields no relevant results).

In some embodiments, response modification unit 145 can modify the chatbot response to correct inaccuracies based on the retrieved data. For example, in some embodiments, response modification unit 145 can recognize a text structure of a bibliography included in the chatbot response, and can correct the chatbot's bibliography based on recognized bibliographical information from the data sources.

FIGS. 2A-2E illustrate example user interface screens presented to a user of user system 105 when making inquiries of chatbot system 110, in accordance with some embodiments of the presently disclosed subject matter.

Figure 2A:
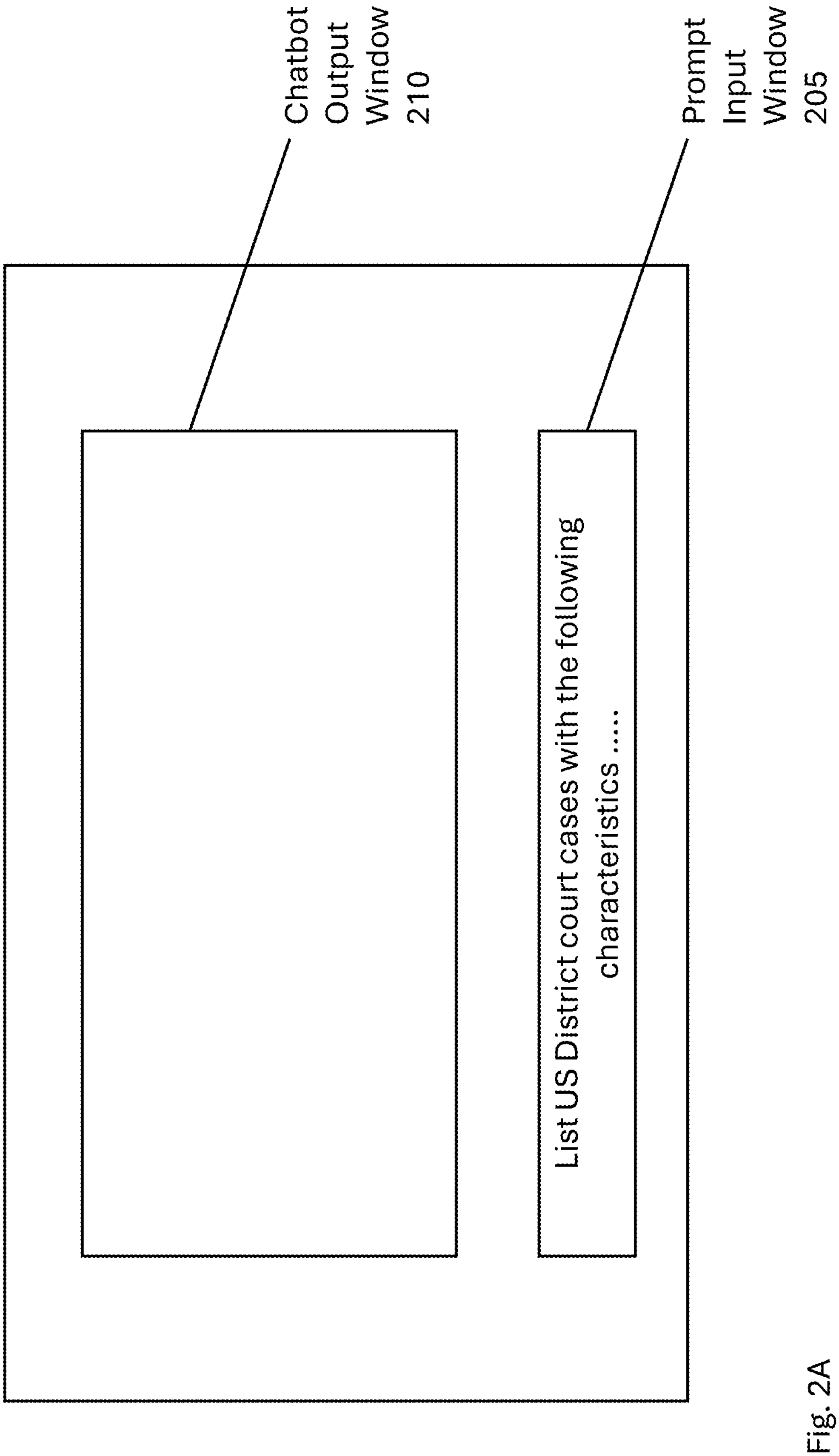
FIGS. 2A-2E illustrate example user interface screens presented to a user of user system 105 when making inquiries of chatbot system 110, in accordance with some embodiments of the presently disclosed subject matter.

FIG. 2A depicts a screen view presented to the user. The screen view includes a prompt input window 205 in which a user can type prompts for a chatbot. The user's screen view can also include a chatbot output window 210, which will display the eventual chatbot responses. In this case, the user has entered a prompt: "list U.S. District Court cases with the following characteristics."

Figure 2B:
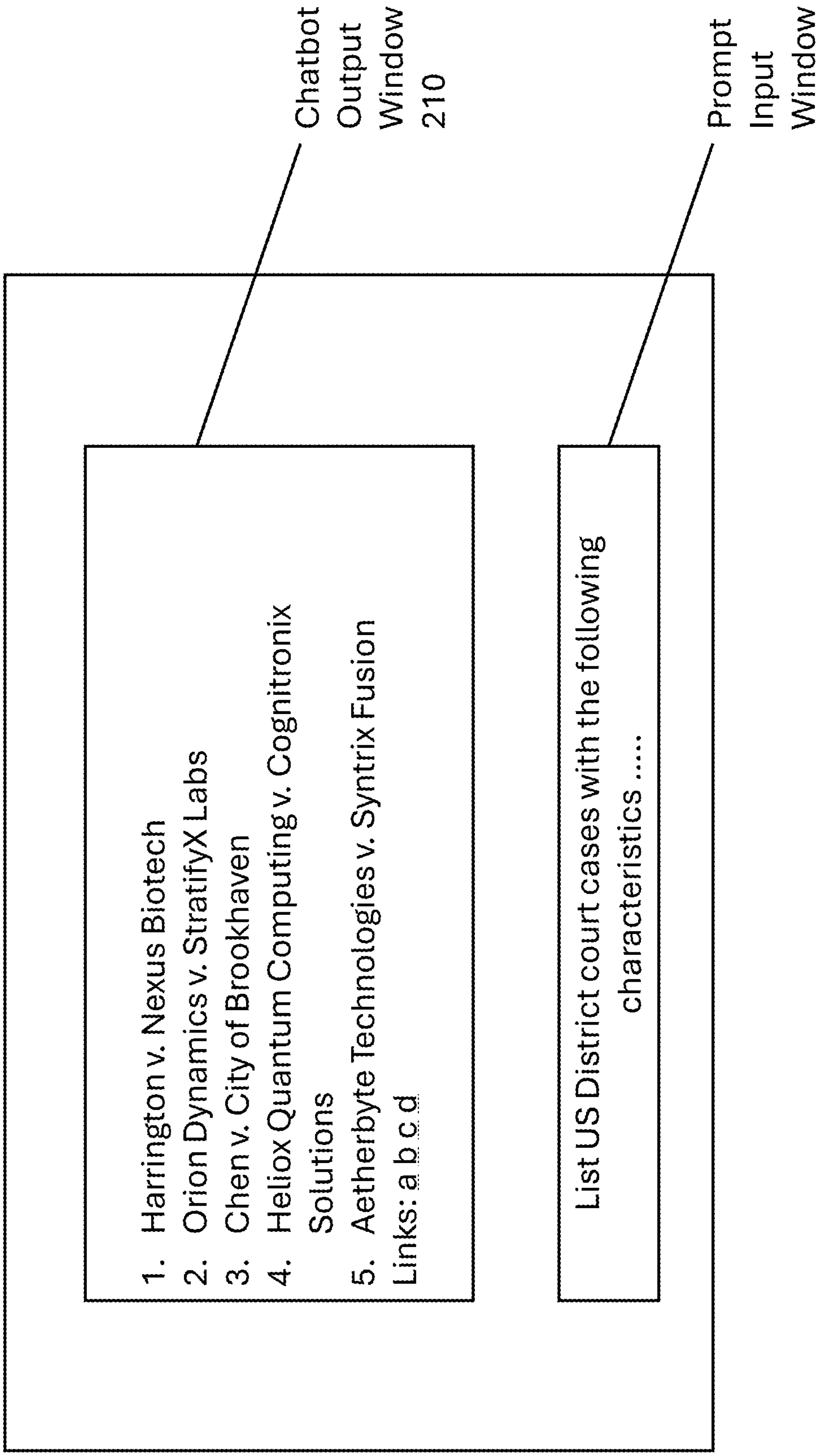

FIG. 2B shows an initial response of the chatbot in chatbot output window 210. The response includes a list of names court cases, and the output also includes four hyperlinks to data sources.

Figure 2C:
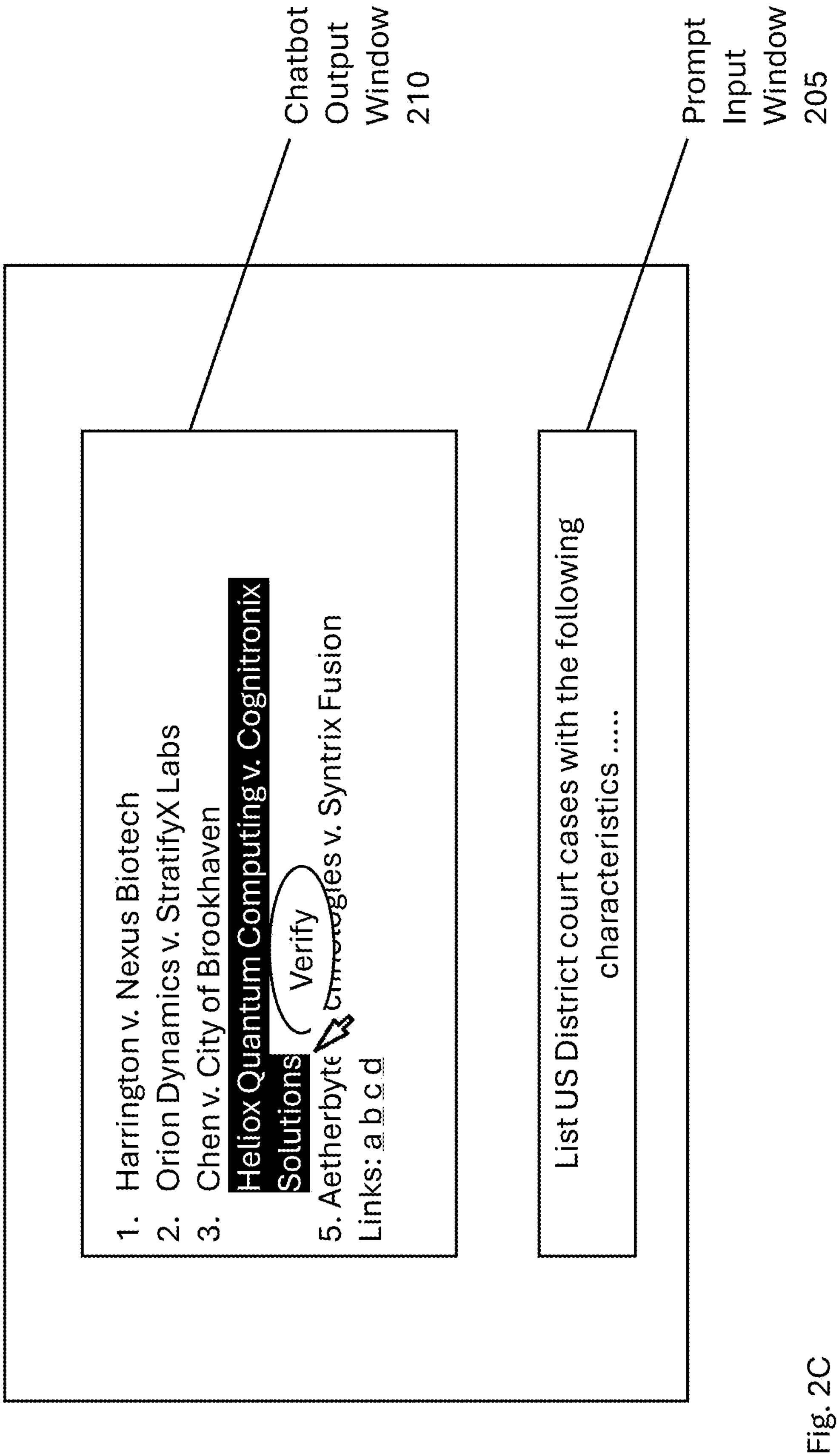

FIG. 2C illustrates that the user has highlighted text in chatbot output window 210 and has right-clicked so that the option to "verify" appears.

Figure 2D:
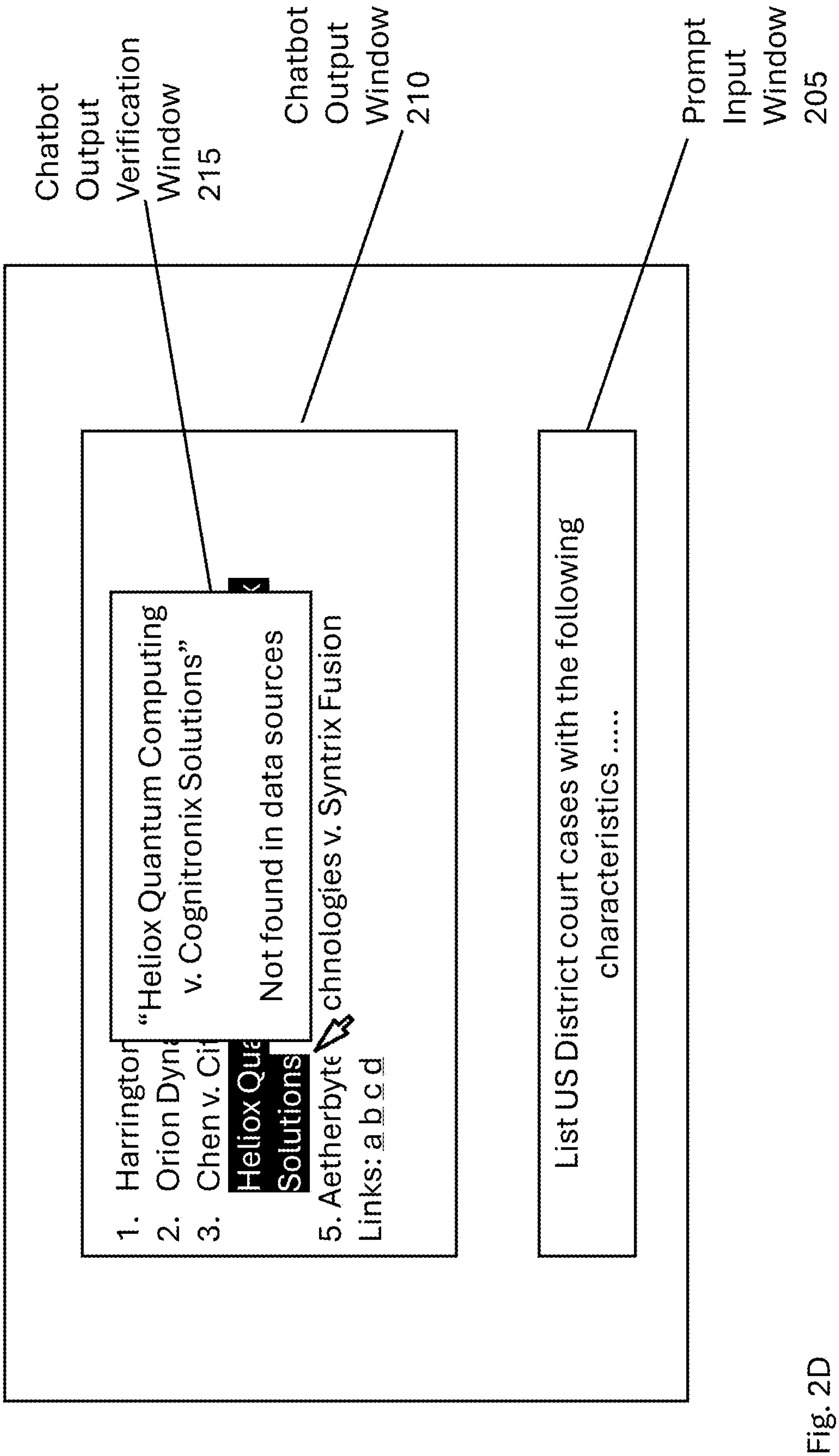

FIG. 2D shows that a chatbot output verification window 215 has appeared on top of chatbot output window 210. In this example, chatbot output verification window 215 displays text indicating that the highlighted text is not found in the data sources.

In other examples, chatbot output verification window 215 displays relevant text found in data sources (e.g. text or summary of the highlighted name of the court case).

Figure 2E:
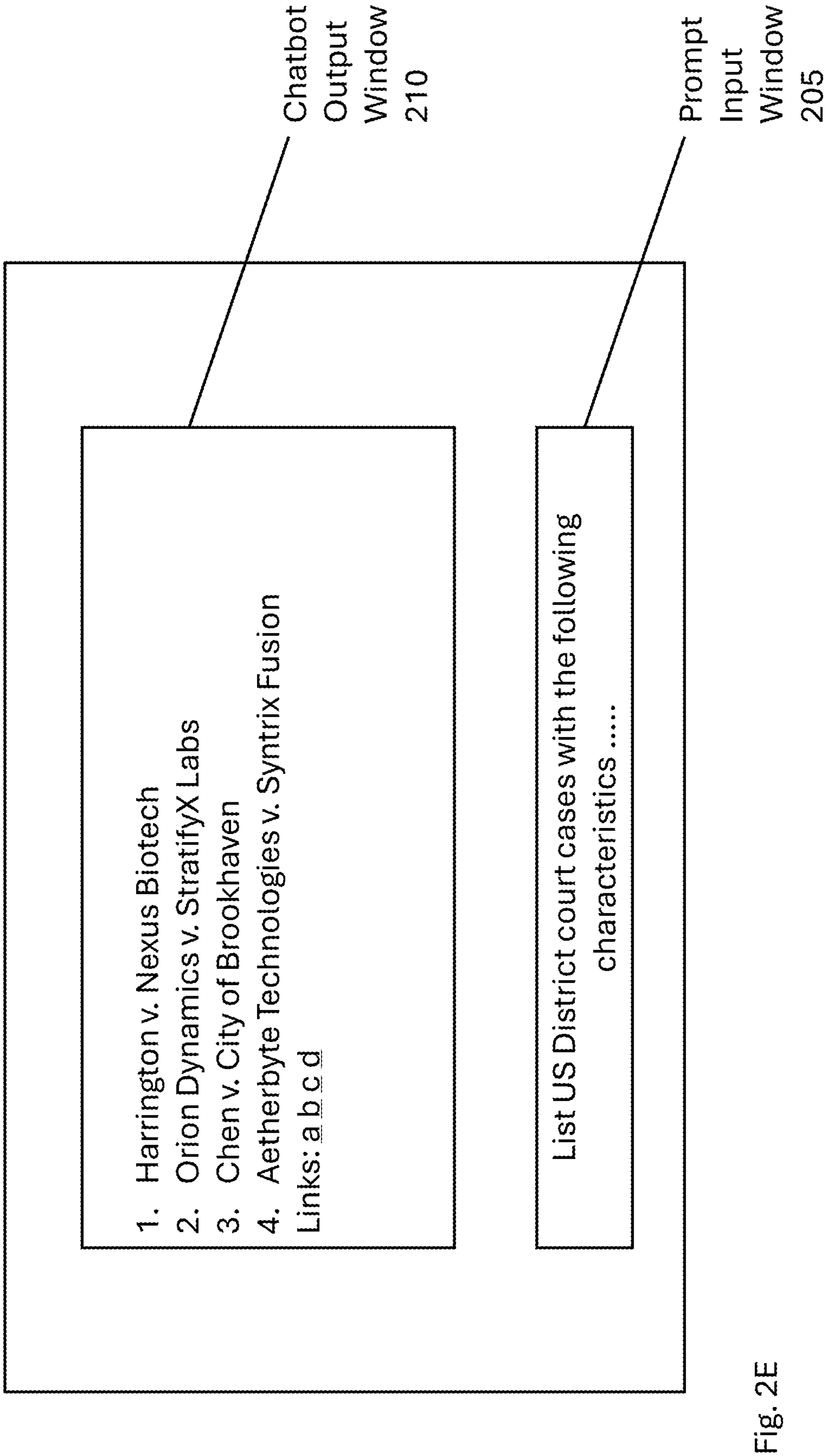

FIG. 2E displays a corrected chatbot response wherein hallucinated text for which no basis was found has been removed.

FIG. 3 illustrates a method of adding to and/or modifying chatbot responses to compensate for and/or correct hallucinations and/or inaccuracies, in accordance with some embodiments of the presently disclosed subject matter.

As described above with reference to FIG. 1, the method of FIG. 3 can operate e.g. subsequent to chatbot correction system (processing circuitry) 100 presenting a user-provided prompt to a chatbot system.

Chatbot correction system (processing circuitry) 100 (e.g. chatbot response processing unit 130) can receive 305 a response from the chatbot system 110 e.g. in reply to the user-provided prompt (or data derivative of a user-provided prompt).

In some embodiments, the chatbot response includes references to data sources. By way of non-limiting example: the chatbot response can include hypertext transfer protocol (HTTP) links to internet-based data sources relevant to the chatbot-generated text response. Alternatively, the chatbot response can include data identifying other data sources (such as bibliographic information pertaining to books not available on the internet, but available on a private server). Optionally: chatbot correction system (processing circuitry) 100 (e.g. data source retrieval unit 145) can retrieve one or more of the data sources for future utilization.

Chatbot correction system (processing circuitry) 100 (e.g. chatbot response processing unit 130) can next present 310 the chatbot response to user system 105. Optionally: processing circuitry 100 (e.g. chatbot response processing unit 130) can modify the chatbot response prior to presenting it. Optionally: chatbot correction system (processing circuitry) 100 (e.g. chatbot response processing unit 130) can include the identification of and/or hyperlinks to data sources originally provided by chatbot system 110 in its presentation. Optionally: chatbot correction system (processing circuitry) 100 (e.g. chatbot response processing unit 130) can append 310 identification of and/or hyperlinks to additional data sources.

Chatbot correction system (processing circuitry) 100 (e.g. potential inaccuracy identification unit 135) can then receive 315 user input pertaining to the displayed response to his/her prompt. By way of nonlimiting example: the user can, using a browser or application interface of user system 105, select a part of the chatbot response which the user suspects to be a hallucination or other kind of inaccuracy. FIGS. 2A-2E above describe an example of a system enabling this kind of user input.

More generally: some embodiments can enable the user of user system 105 to specify one or more segments of text (each being of at least one character in length), indicating part of the response, particular terms within the response, or terms not appearing directly in the response but potentially pertinent to suspected hallucinations or inaccuracies.

Chatbot correction system (processing circuitry) 100 (e.g. search engine unit 140) can search 320 one or more data sources to identify content relevant to the user-specified input. By way of non-limiting example, chatbot correction system (processing circuitry) 100 (e.g. search engine unit 140) can perform an exact-match or approximate-match text search of a user-input text or texts within one or more (for example: all) of the data sources it is aware of. By way of further non-limiting example, chatbot correction system (processing circuitry) 100 (e.g. search engine unit 140) can perform one or more semantic searches (for example: as described at https://en.wikipedia.org/wiki/Semantic_search) of a user-input text or texts within one or more (for example: all) of the data sources it is aware of.

Chatbot correction system (processing circuitry) 100 (e.g. response modification unit 145) can next modify or append to 325 the chatbot response based on the search results. For example: chatbot correction system (processing circuitry) 100 can append (or otherwise display) sections of the data sources that it identified as relevant to the displayed text. For example: if the user selected a particular term in the chatbot response, and chatbot correction system (processing circuitry 100) (e.g. response modification unit 145) can append a section of a data source in which the selected term appears). Alternatively: chatbot correction system (processing circuitry) 100 (e.g. response modification unit 145) can append text indicating that the term was not found in any of the data sources.

In some embodiments, chatbot correction system (processing circuitry) 100 (e.g. response modification unit 145) can have capabilities to recognize particular types of inaccurate responses, and modify the chatbot response based on the results of the search of the data source (e.g. by removing a hallucinated reference as shown in FIG. 2E). By way of non-limiting example, processing circuitry 100 can be configured to recognize bibliographic data, and then correct inaccurate chatbot output based on data from the data source.

Those skilled in the art will readily appreciate that various modifications and changes can be applied to the embodiments of the invention as hereinbefore described without departing from its scope, defined in and by the appended claims.

The invention claimed is:

1. A system of correcting inaccuracies in chatbot responses, the system comprising a processing circuitry (PC) configured to:

receive at least part of a chatbot's response to a user prompt, and receive data indicative of data sources, the data sources being indicated by the chatbot as relevant to the chatbot's response;

present, to the user, data derivative of the chatbot response, and receive, from the user, data indicative of one or more text segments, the one or more text segments being associated with a user-suspected hallucination or inaccuracy of the chatbot response;

perform, on one or more of the data sources, at least one of:

a text search, and a semantic search of one or more of the text segments; and present, to the user, data derivative of the text search and/or semantic search, thereby providing confirmation or correction of the chatbot response.

2. The system of claim 1, wherein at least one of the one or more data sources is provided by the chatbot.

3. The system of claim 1, wherein the received data indicative of one or more text segments is derivative of, at least, a user utilization of a device's user interface while viewing the chatbot response.

4. The system of claim 1, wherein the data derivative of the text search and/or semantic search is null, thereby being indicative of a hallucination in the chatbot response.

5. The system of claim 1, wherein the data derivative of the text search and/or semantic search is a text segment of a data source, thereby providing a clarification, confirmation, or correction of the response.

6. The system of claim 1, wherein the chatbot is a large language mode (LLM).

7. The system of claim 1, the data derivative of the text search and/or semantic search is: a corrected chatbot response.

8. A processing circuitry-based method of correcting inaccuracies in chatbot responses, the method comprising:

receiving at least part of a chatbot's response to a user prompt, and receive data indicative of data sources, the data sources being indicated by the chatbot as relevant to the chatbot's response;

presenting, to the user, data derivative of the chatbot response, and receive, from the user, data indicative of one or more text segments, the one or more text segments being associated with a user-suspected hallucination or inaccuracy of the chatbot response;

performing, on one or more of the data sources, at least one of:

a text search, and a semantic search of one or more of the text segments; and presenting, to the user, data derivative of the text search and/or semantic search, thereby providing confirmation or correction of the chatbot response.

9. A computer program product comprising a computer readable non-transitory storage medium containing program instructions, which program instructions when read by a processing circuitry, cause the processing circuitry to perform a method of correcting inaccuracies in chatbot responses, the method comprising:

receiving at least part of a chatbot's response to a user prompt, and receive data indicative of data sources, the data sources being indicated by the chatbot as relevant to the chatbot's response;

presenting, to the user, data derivative of the chatbot response, and receive, from the user, data indicative of one or more text segments, the one or more text segments being associated with a user-suspected hallucination or inaccuracy of the chatbot response;

performing, on one or more of the data sources, at least one of:

a text search, and a semantic search of one or more of the text segments; and presenting, to the user, data derivative of the text search and/or semantic search, thereby providing confirmation or correction of the chatbot response.

* * * * *